DRY PROCESSED PHOTOTHERMOGRAPHIC PRINTING PLATE AND PROCESS

Filed March 30, 1960

Frederick J. Rauner
Isadore F. Rosati
Earl M. Robertson
INVENTORS

BY R. Frank Smith
Lawrence H. Willis
ATTORNEYS

United States Patent Office — 3,100,702 — Patented Aug. 13, 1963

3,100,702

DRY PROCESSED PHOTOTHERMOGRAPHIC PRINTING PLATE AND PROCESS

Frederick J. Rauner, Isadore F. Rosati, and Earl M. Robertson, Rochester, N.Y., assignors to Eastman Kodak Company, Rochester, N.Y., a corporation of New Jersey Filed Mar. 30, 1960, Ser. No. 18,745
20 Claims. (Cl. 96—33)

Figure 1:
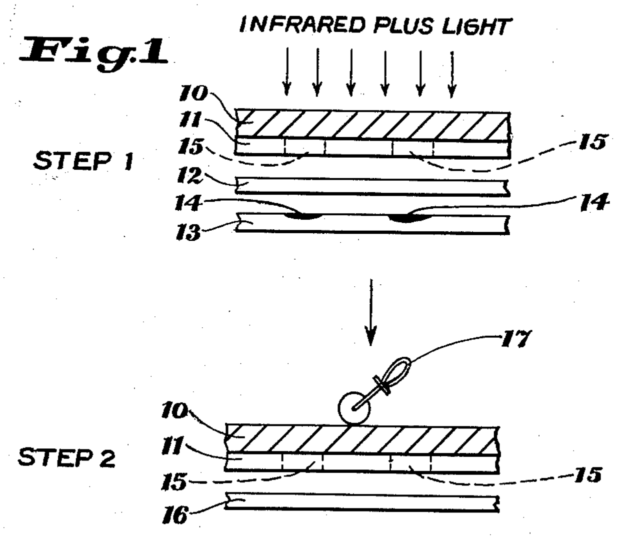

The present invention relates to a new process of preparing duplicate masters for printing, a process of preparing copies of a graphic original, and photographic elements useful therefor.

It is known that printing plates for lithography, stencil copying and hectographic printing can be prepared by photographic techniques, which generally require water or solvents at some stage during processing. Roshkind, U.S. Patent 2,808,777, issued October 8, 1957, describes a method of manufacturing lithographic, stencil or hectographic duplicating masters by a thermographic process which entirely avoids the use of liquids during processing.

Both photographic and thermographic copying techniques have certain disadvantages and limitations which restrict their use. One of the principal disadvantages of certain photographic techniques is that they generally require liquids at some stage during processing. On the other hand thermographic processes do not generally require liquids during the processing stages, although it is a matter of common knowledge that such thermographic processes are limited to copying of materials showing differential absorption of infrared energy. Moreover, many thermographic processes do not provide sufficiently rapid processing, so that the heat pattern has a tendency to diffuse, thus materially lowering the quality of the copy or duplicate master.

Our invention embodies many of the advantages of photography and thermography while substantially avoiding the disadvantages of both processes. The processes of our invention employ the light-sensitivity of certain polymeric materials and the heat-sensitivity of certain fusible materials, such as polyethylene glycol resins.

It is, therefore, an object of our invention to provide a method of manufacturing copies of a graphic original. Another object is to provide a method of manufacturing duplicating masters for use in lithographic processes. Still another object is to provide a method of manufacturing stencils for preparing multiple copies of a line or half-tone original. Another object of our invention is to provide a method of preparing duplicating masters for use in hectographic copying processes. Still another object is to provide copying sheets useful in the aforementioned processes. Other objects will become apparent from a consideration of the following description and examples.

According to our invention, we have found that copies of a graphic original (line or half-tone) can be prepared by exposing a heat-sensitive, ultraviolet or visible-light-sensitive matrix sheet to a line or half-tone original with ultraviolet radiation or visible light so that the light-sensitive resin of the matrix sheet is hardened in the exposed areas, and simultaneous or subsequent heating of the matrix sheet, thereby causing softening of the matrix sheet in the areas not exposed to light, and transferring the softened portions to a receiving sheet or duplicating master sheet.

The term "light-sensitive" as used herein includes sensitivity either in the visible or ultraviolet regions of the spectrum, or both.

The matrix sheets used in our invention comprise a light-sensitive resin and a heat-fusible waxy material, such as a polyethylene glycol resin. For direct copying processes, the matrix sheets can contain a dye or pigment which is transparent to infrared radiation.

Figure 2:
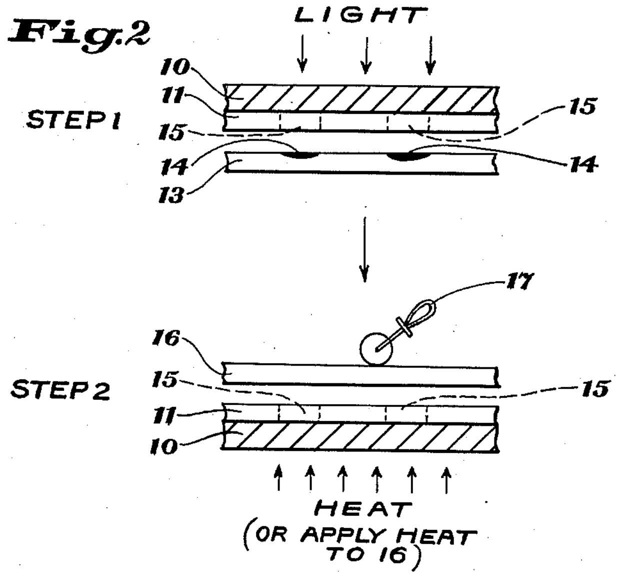

The exposure to visible or ultraviolet light and the heating of the matrix sheet can be carried out simultaneously, or the matrix can be first exposed to visible light and subsequently heated to effect transfer of the softened portions to a receiving sheet or duplicating master. These methods of operation are illustrated in the accompanying drawing, where:

FIGURE 1 represents an assembly suitable for simultaneously exposing the matrix sheet to visible light and to heat, while FIGURE 2 shows an assembly useful for exposing the matrix sheet first to light, followed by heating to effect transfer of the softened portions.

The light-sensitive resins useful in practicing our novel process comprise any of the well-known resins which have been previously described in the prior art as having sufficient light sensitivity to permit copying of a graphic original. Included among such light-sensitive resins are polymers having a substantial proportion of side chains containing azido groups attached to carbon atoms of the side chain. Also embraced by our invention are light-sensitive polymers containing "carbon-to-carbon" double bonds either in the side chain or in the linear chain of the polymer. Light-sensitive polymers containing an azido group can be prepared according to methods described in Merrill and Unruh U.S. Serial No. 525,368, filed July 29, 1955. For example, these azide polymers can be prepared as follows:

AZIDE POLYMERS

In accordance with our invention, we prepare light-sensitive film-forming azidostyrene homopolymers containing the following recurring structural unit:

(I)

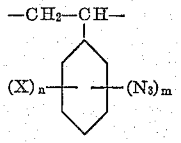

or copolymers of said azidostyrenes consisting of the following recurring structural units in random combination:

(II)

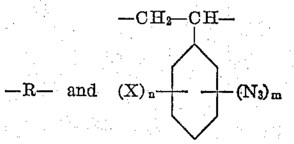

(a) (b)

wherein the ratio of II(*a*) units to II(*b*) units in each resin molecule can vary from 1:19 to 19:1, i.e., II(*b*) are present from 5 to 95 mole percent, and wherein *m* represents in each instance a digit 1 or 2, *n* represents a digit of from 0 to 2, X represents a hydrogen atom, a chlorine atom, an alkyl group containing from 1 to 4 carbon atoms, e.g., methyl, ethyl, propyl, butyl, etc., an alkoxy group containing from 1 to 4 carbon atoms, e.g., methoxy, ethoxy, propoxy, butoxy, etc., and a nitro group, and R represents a unit such as ethylene, isobutylene, a 1,3-butadiene, styrene and substituted styrenes, etc., an α,β-unsaturated mono- or di-carboxylic acid unit such as acrylic acid, an α-alkylacrylic acid, maleic acid, citraconic acid, itaconic acid, etc., and the anhydrides, alkyl esters, imides, N-alkyl imides, nitriles, amides, and N-alkyl and N,N-dialkyl substituted amides of these acids, fumaric and mesaconic acids and their alkyl esters, nitriles, amides and N-alkyl and N,N-dialkyl substituted amides, vinyl alkyl ketones such as vinyl methyl ketone, vinyl halides, such as vinyl chloride, vinylidene halides, such as vinylidene chloride, and the like units, and wherein in each instance in the above the alkyl and alkoxy groups contain from 1 to 4 carbon atoms, by diazotizing a polyaminostyrene or a copolymer of aminostyrene and reacting the resulting diazonium salt with sodium azide, followed by separation of the azido derivative from the reaction mixture. The intermediate aminostyrene polymers can be prepared by nitrating the styrene nucleus of the appropriate styrene polymer and then reducing the nitro derivative to the corresponding amine derivative. Where R in the above structure II is an $\alpha,\beta$-unsaturated di-carboxylic acid unit, e.g., a 1:1 copolymer of an azidostyrene and maleic acid, the copolymer can be treated with acetic anhydride to give the maleic anhydride derivative and this can then be reacted with a variety of hydroxyl- and amino-containing components, including hydroxylated azide-containing components which greatly increases the azide content of the polymer molecule, to give the corresponding ester and amide derivatives. In place of the maleic acid-azidostyrene copolymer, there can be employed citraconic or itaconic acid copolymers with the azidostyrene.

To obtain the film-forming, light-sensitive polymers of the invention, wherein the azido grouping is contained in an ester type side chain of the polymer, as in the azidobenzoates of vinyl alcohol polymers represented, for example, by the homopolymers consisting essentially of the following recurring structural unit:

(III)

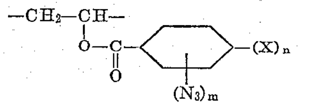

or by copolymers consisting essentially of the following recurring structural units in random combination:

(IV)

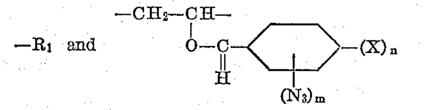

(a) (b)

wherein the ratio of IV($a$) units to IV($b$) in each resin molecule can vary from 1:19 to 19:1, and wherein $m$, $n$ and X are as previously defined, and $R_1$ represents a unit such as ethylene, isobutylene, 1,3-butadiene, etc., a vinyl or isopropenyl carboxylic ester, ether, ketone, carbamate or acetal, and the like units, an o-, m- or p-azidobenzoyl chloride represented by the general formula:

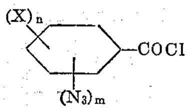

wherein $m$, $n$ and X are as above defined, is condensed with a polyvinyl alcohol, a partially hydrolyzed polyvinyl or a polyisopropenyl ester, e.g., partially hydrolyzed polyvinyl acetate, polyvinyl butyrate, polyvinyl benzoate, polvinyl carbamate, polyvinyl cinnamate, polyvinyl cyanoacetate, polyvinyl azidobenzoate, etc., or with a partially hydrolyzed copolymer of vinyl and isopropenyl esters, or with partial alkyl ethers of polyvinyl alcohol, or with partial polyvinyl acetals. The free hydroxyl groups in each instance can be partially or substantially completely esterified, as desired, with the azidobenzoyl chloride reactant. Where the esterification of a partially hydrolyzed polyvinyl acetate with azidobenzoyl chloride is incomplete, the final light-sensitive polymer product may contain more than two different units making up the structure such as vinylazidobenzoate units, vinyl acetate units and vinyl alcohol units.

In place of the azidobenzoyl chloride, there my be employed an azidonaphthoyl chloride, azidophenylacyl chlorides, such as o-, m- or p-azidophenylacetyl chloride, etc., an azidocinnamoyl chloride, and the like, to give the corresponding polymeric derivatives of the above-mentioned hydroxyl-containing polymers. The mentioned azido-group-containing acid chlorides are also capable of condensing with other hydroxylic polymeric materials, for example, with naturally occurring materials such a cellulose, starch, guar, alginic acid or with their partially esterified or etherified derivatives to give other operable light-sensitive polymers. The said acid chlorides are capable of condensing also with polymeric materials containing amino groups having free hydrogen atoms, for example, with synthetic polymers such as polyvinylamine, polyvinyl anthranilate, polymeric aminotriazoles, etc., as well as with naturally occurring polymers, such as gelatin, to give the corresponding light-sensitive amide derivatives.

To obtain the film-forming, light-sensitive polymers of the invention wherein the azido grouping is contained in a different ester type of side chain of the polymers, as in the azidophthalates of vinyl alcohol polymers represented, for example, by homopolymers consisting essentially of the following recurring structural unit:

(V)

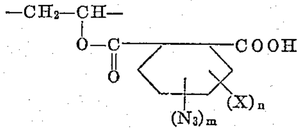

or by copolymers consisting essentially of the following recurring structural units in random combination:

(VI)

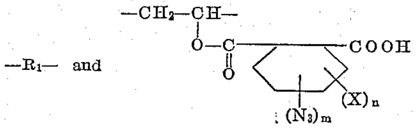

(a) (b)

wherein the ratio of VI($a$) units to VI($b$) units in each resin molecule can vary from 1:19 to 19:1, and wherein $m$, $n$, X and $R_1$ are as previously defined, an o-, m- or p-azidophthalic anhydride is condensed with a hydroxylic polymer such as mentioned in the process for preparing the light-sensitive polymers of structures III and IV. The azidophthalic anhydride can be substituted by various azidonaphthalic anhydrides. Also, the azidophthalic and azidonaphthalic anhydrides may be condensed with amino-group-containing synthetic polymers such as polyvinylamines, polyvinyl anthranilates, polymeric aminotriazoles, etc., and proteins, such as gelatin, casein, etc., to give the corresponding light-sensitive amide derivatives.

To obtain the film-forming, light-sensitive polymers of the invention wherein the azido grouping is contained in a still different ester type of side chain of the polymer as in the esters of azidophenylalkanols with maleic anhydride copolymers consisting essentially of the following recurring structural unit:

(VII)

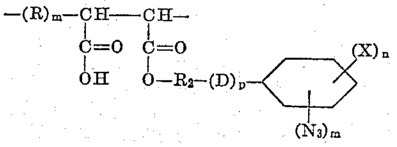

wherein $m$, $n$, X and R are as previously defined, $R_2$ represents an alkylene group containing from 1 to 4 carbon atoms such as $-CH_2-$, $-CH_2CH_2-$, etc., D represents an atom of oxygen, an atom of sulfur, an imino group or an alkylimino group and $p$ represents a digit 0 or 1, a hydroxylated azido-group-containing compound, such as an o-, m- or p-azidophenylalkanol, such as represented by the general formula:

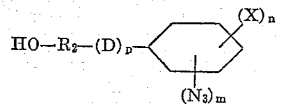

wherein $m$, $n$, X, $R_2$, D and $p$ are as previously defined, is condensed with a maleic anhydride copolymer, preferably with a 1:1 styrene-maleic anhydride copolymer. As typical azidobenzylalkanols, there may be employed, for example, p-azidobenzyl alcohol, o-azidobenzyl alcohol, m-azidobenzyl alcohol, 2-(azidophenyl)ethanol, an azidophenoxyethanol, an aliphatic hydroxylated azido compound, such as 2-azidoethanol or 2-azido-2-phenylethanol to give the corresponding light-sensitive esters. Also, the maleic anhydride copolymer can be replaced by polyacrylic or polymethacrylic anhydrides to give generally similar light-sensitive polymers with the said hydroxylated azido group containing compounds.

To obtain the film-forming, light-sensitive polymers of the invention wherein the azido grouping is contained in an acetal group attached to a polymer chain, as in polyvinyl azidobenzalacetals consisting essentially of the following recurring structural unit:

(VIII)

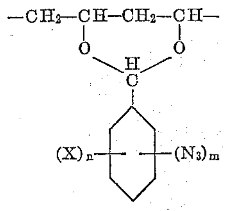

wherein $m$, $n$ and X are as previously defined, a polyvinyl alcohol or a carboxylic ester thereof such as polyvinyl acetate, polyvinyl butyrate, etc., is condensed, in the presence of an acid catalyst with an azidobenzaldehyde represented by the general formula:

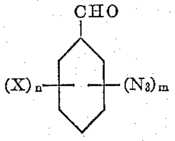

wherein $m$, $n$ and X are as previously defined. The intermediate azidobenzaldehydes can be prepared, in general, by the method described by M. O. Forster and H. M. Judd, J. Chem. Soc. 97, page 254 (1910), wherein an aminobenzaldehyde is diazotized and then treated with sodium azide to give the corresponding azidobenzaldehyde. Where the polyvinyl alcohol is only partly acetalized, the final light-sensitive polymeric product will also contain some unreacted hydroxyl groups and, in the case where a polyvinyl ester is employed as the initial polymeric material and is only partially acetalized, the final light-sensitive polymer may contain both acetal and ester groups. It is also within the invention to employ partially hydrolyzed polyvinyl esters and to only partially acetalize the available hydroxyl groups. The above-described light-sensitive polymeric products containing residual or unreacted hydroxyl groups can advantageously be further modified by acylation with acid chlorides or anhydrides or by carbamylation with isocyanates. For instance, a partial polyvinyl azidobenzalacetal may be acetylated, maleylated, succinoylated, phthaloylated, benzoylated, cinnamoylated, etc.

To obtain the light-sensitive polymers of the invention, such as polyvinyl azidocarboxylic esters represented, for example, by the recurring structural unit:

(IX)

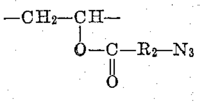

wherein $R_2$ is as previously defined, a polyvinyl halogen-substituted ester such as polyvinyl chloroacetate, polyvinyl, ω-chloropropionate, polyvinyl ω-chlorobutyrate, etc. is reacted with sodium azide to give the said light-sensitive polymer. The light-sensitive resins are substantially composed of units represented by structure IX and, accordingly, contain a relatively high proportion of azido groups. Various starting copolymers of the said polyvinyl halogenated esters can be employed. However, light-sensitive polymers of the above-described kind, we have found, are generally less stable and of a lower order of light-sensitivity than those of structures I–VIII.

Other light-sensitive polymers which can be employed in our invention comprise those described in Minsk et al. U.S. Patent 2,610,120, issued September 9, 1952; Minsk et al. U.S. Patent 2,751,296, issued June 19, 1956; Minsk et al. U.S. Patent 2,801,233, issued July 30, 1957, and Smith et al. U.S. Patent 2,811,509, issued October 29, 1957. Particularly useful polymers of the type described in these patents are those obtained by esterifying polyvinyl alcohol (which may contain a small amount of residual acetyl) with cinnamic acid or a derivative thereof, such as cinnamoyl chloride.

The light-sensitive resins used in our invention can contain sensitizers in order to increase the effective speed of such polymers.

The heat-fusible, waxy component of the matrix sheets used in our invention comprise, for example, polyethylene glycols or derivatives thereof which are solids at room temperature. Many of these polyethylene glycols are sold under trade names, such as Carbowaxes. These derivatives can be represented by the following general formula:

$$R{-}OCH_2CH_2O(CH_2CH_2O)_nCH_2CH_2OR_1$$

wherein R and $R_1$ each represents a hydrogen atom, an alkyl radical, such as methyl, ethyl, propyl, butyl, etc., or a carboxylic acyl radical and $n$ has a value of at least 7 (e.g., a digit of from about 7 to 500).

Other heat-fusible, waxy materials which can be employed in our invention include ferric stearate, stearamide, Chlorowax No. 70 (a chlorinated hydrocarbon wax), paraffin, carnauba wax, Japan wax, stearic acid, etc.

The heat-fusible, waxy materials useful in our invention melt within the range of about 60–250° C., although lower or higher melting solids can be used. Where paper is used as the support for the matrix, the waxy material used should melt below the charring temperature of the paper (or melting point of film support where film is used).

The amounts of light-sensitive resins and heat-fusible, waxy material which can be used in our invention can be varied depending upon the light-sensitivity of the resin, the softening temperature of the waxy material, etc. In general, we have found that the matrix sheet can contain from 0.125 to 1.0 part by weight of the light-sensitive resin and from 1.0 to 8.0 parts by weight of the heat-fusible, waxy material.

For preparing direct copies of a graphic original, the light-sensitive matrix sheet can contain one or more organic dyes or inorganic pigments which have the property of absorbing substantially no infra-red radiation. For example, Durol black, Malachite green, etc., can be used to tint the matrix sheet to provide visible copies of the graphic original.

For a further description of the operation of our invention, reference is made to FIGURE 1 which shows simultaneous infra-red and light exposure of the matrix sheet. In the drawing the elements are shown in spaced relationship for the purpose of clarity, although it will be appreciated that these elements are actually in surface contact during operation of the process. In step 1 of FIGURE 1, infra-red and light reflex exposure is made through a transparent base 10 coated with a heat and light-sensitive layer 11, which is in contact with a 0.002 inch transparent plastic sheet 12. The plastic sheet 12 is in contact with a graphic original 13 having infra-red absorbing portions 14. The light causes partial hardening of the exposed portions of layer 11 and softening of the areas 15 in association with areas 14 of the graphic original. In step 2 of FIGURE 1, the matrix sheet containing the softened portion 15 is placed in contact with a receiving sheet 16 and pressure is applied to the rear surface of the matrix sheet by any suitable means, such as by a roller 17.

Providing the matrix sheet is contacted with the receiving sheet substantially immediately after exposure, no further heating is required in order to transfer the areas 15 to the receiving sheet. However, if the softened areas 15 are allowed to harden, it is necessary to apply heat once again to the matrix sheet in order to soften the areas 15 and to effect transfer to the receiving sheet.

In FIGURE 2 there is depicted an arrangement suitable for successive light and heat treatments of the matrix sheet. In step 1 of FIGURE 2, the transparent matrix sheet is given a reflex exposure to light as shown. The areas in contact with the graphic portions 14 of the graphic original 13 do not receive sufficient exposure to cause hardening while the remaining areas of the matrix sheet are differentially hardened. In step 2 of FIGURE 2 the matrix sheet is placed upon a heated surface (at a temperature of from about 150 to 180° F., for example) and pressure is applied by means of a roller 17 to the rear surface of the receiving sheet 16. The softened areas 15 thereupon transfer to the receiving sheet. When the receiving sheet is used as a direct copy of the graphic original, such as by incorporating a dye or pigment in the matrix sheet, it does not matter whether the receiving sheet and the transferring areas have different properties insofar as susceptability to inking is concerned.

The following examples will serve to illustrate more fully the operation of our invention.

EXAMPLE 1

*Image-Wise Transfer of Light Exposed Combination of Photosensitive and Heat-Fusible Polymers*

A coating formulation was prepared as follows:

SOLUTION A

| | |
|---|---|
| Polyethylene glycol (Carbowax 4000)----------g-- | 20 |
| Water ----------------------------------------cc-- | 125 |

SOLUTION B

| | |
|---|---|
| Poly(vinylacetate-3-azidophthalate) ------------g-- | 5 |
| 0.5% ammonium hydroxide-------------------cc-- | 50 |
| Durol black-------------------------------------g-- | .05 |

Solutions A and B were combined and whirl coated at 78 r.p.m. on .005-inch thick silicated grained aluminum. The coatings were dried with the aid of forced warm air. Each coating was exposed through a positive transparency in a vacuum frame for 2 minutes at 4 feet from a 95 amp. carbon arc. The unexposed areas were heat transferred to a paper receiving sheet by rolling them in contact with a hand roller on a heat-controlled hot plate surface at 155° F. Transfer occurred instantaneously. When the sheets were stripped apart, the unexposed areas had transferred to the receiver sheet.

Light exposures ranged from 2 to 15 minutes, while temperatures of transfer ranged between 150 and 160° F.

EXAMPLE 2

*Multiple Transfer of a Precolored Image*

A coating formulation was prepared as follows:

SOLUTION C

| | |
|---|---|
| Polyethylene glycol (Carbowax M–20,000)----g-- | 20 |
| Water ----------------------------------------cc-- | 300 |

SOLUTION D

| | |
|---|---|
| Poly(vinylacetate-3-azidophthalate) ----------g-- | 5 |
| 0.5% ammonium hydroxide-----------------cc-- | 50 |
| Durol black B----------------------------------g-- | 0.30 |
| 0.1% Aerosol 22 (tetrasodium - N - (1,2-dicarboxyethyl)-N-octadecyl sulfosuccinate) --------ml-- | 60 |

Solutions C and D were combined and hand knife coated at .0015-inch wet thickness on a clear base of cellulose acetate butyrate. Drying was aided with forced warm air. After a light exposure of 3 minutes at 4 feet from a 95 amp. carbon arc through a positive transparency six successive transfers were accomplished in the manner described in Example 1 at a plate temperature of approximately 158° F. Quality decreased with each successive transfer. The colorant can be a dye, a pigment, a reducible metal salt or a color former, such as a color coupler (a reactant causing color formation can be incorporated in the receiving sheet).

EXAMPLE 3

*Speed Sensitization With Photosensitizers*

A coating formulation was prepared as follows:

SOLUTION E

| | |
|---|---|
| Polyethylene glycol (Carbowax 4000)----------g-- | 10 |
| 0.5% ammonium hydroxide-------------------cc-- | 100 |

SOLUTION F

| | |
|---|---|
| Poly(vinylacetate-3-azidophthalate) ------------g-- | 2.5 |
| 0.5% ammonium hydroxide-------------------cc-- | 100 |
| Sulfo-BNTZ (pyridine salt of 2-(3-sulfobenzoylmethylene)-1-methyl-β-naphthothiazoline) --------g-- | 0.1 |
| Water solution of Triton X–200 (sodium salt of p-tert. octylphenoxyethoxyethyl sulfonate)----cc-- | 1.0 |

Solutions E and F were combined and the dope was knife coated at .003-inch wet thickness on cellulose acetate butyrate film base and allowed to dry with the aid of forced warm air. Exposure was made through a combination line and half-tone positive transparency in a pressure frame at 3 inches from an RFL–2 tungsten Photoflood lamp for a period of six seconds. The unexposed areas were transferred to a paper receiving sheet as described in Example 1.

At distances as short as 3 inches, forced-air cooling was necessary to prevent transfer during exposure. This indicates that with the proper set of conditions, light and heat exposure can be applied simultaneously to affect dry transfer of unexposed areas.

As an alternate sensitizer, 3-carboethoxy-7-methyl-4-oxo-1,4a-diaza-naphthalene was used effectively.

The arc exposure at 4 feet was 30 seconds as compared to the 2 minutes used in Example 1, for unsensitized coatings. With the sensitized coatings, an exposure of only 30 seconds was necessary to produce the same effect as was obtained in 3 minutes using the arc exposure as described in Example 2.

EXAMPLE 4

*Heat Transfer of a Hydrophobic Polymeric Image to a Hydrophilic Printing Surface*

The formulation as described in Example 3 was coated on cellulose acetate butyrate, exposed and transferred under the same conditions to a long-run Duplimat master paper printing plate with no further preparation of the surface except for the normal plate wet with Multilith Green Platex. The master was transferred to a Model 1250 Multilith duplicator and 500 impressions were made. There was little or no loss in image qualtity over the length of the run and there was no indication that 500 was a limit of the number of copies obtainable.

EXAMPLE 5

*Use of a Different Photosensitive Polymer*

A coating formulation was prepared as follows:

SOLUTION G

| | |
|---|---|
| Styrene-maleic anhydride ester of p-hydroxyethoxy-p'-carboxyethoxy benzalacetophenone---------g-- | 2.0 |
| 0.5% ammonium hydroxide-----------------cc-- | 100 |
| Polyethylene glycol (Carbowax 6000)--------g-- | 1.5 |
| Polyethylene glycol (Carbowax 4000)---------g-- | .125 |
| 10% water solution of Triton X–200---------cc-- | 1 |
| Acid black-------------------------------------g-- | .05 |

The dope was knife coated at .003-inch wet thickness on cellulose acetate butyrate and exposed as described in Example 3 at 4 inches from an RFL–2 Photoflood lamp for a duration of 20 seconds. The unexposed areas were transferred, as described in Example 4, to a paper Duplimat master. The temperature range over which the transfer could be successfully made was 160–180° F.

EXAMPLE 6

*Transfer of a Post-Colored Image*

A coating formulation was prepared as follows:

| | | |
|---|---|---|
| Polyethylene glycol (Carbowax 4000) | g | 20 |
| Water | cc | 125 |
| 0.5% ammonium hydroxide solution containing | cc | 50 |
| Poly(vinylacetate-3-azidophthalate) | g | 5 |

The dope was knife coated at .003-inch wet thickness on cellulose acetate butyrate film base. After exposure and transfer as described in Example 1, the transferred image was dyed by dipping or swabbing in a dye solution of the following composition:

| | | |
|---|---|---|
| Astrazol black BV | g | 0.05 |
| Ethyl alcohol | cc | 25 |

The transferred polymeric image accepted the dye to give it sufficient contrast from the background.

EXAMPLE 7

*Reflex Exposures*

The formulation described in Example 3 was knife coated at .003-inch wet thickness on cellulose acetate butyrate. The coating was placed face down on copy consisting of black letters on a highly reflective paper in a pressure frame covered with glass. Exposures were made through the base of the coating such that the light reflected off of the copy and back through the coating. The light was filtered with a 2B filter cutting off essentially all of the ultraviolet emission from the lamp. After an exposure of 20 seconds at 3 inches from an RFL–2 Photoflood lamp, the transfer was made with a hand roller to the surface of a Duplimat master at a temperature of 150° F.

EXAMPLE 8

A coating formulation was prepared as follows:

| | | |
|---|---|---|
| Polyethylene glycol (Carbowax 4000) | g | 9.0 |
| Poly(vinylacetate-3-azidophthalate) | g | 1.25 |
| Sulfo-BNTZ (pyridine salt of 2-(3-sulfobenzoylmethylene)-1-methyl-β-naphthothiazoline) | g | .05 |
| 10% water solution of Triton X–200 (sodium salt of p-tert. octylphenoxyethoxyethyl sulfonate) | cc | 0.5 |
| 0.5% ammonium hydroxide | cc | 100.0 |

The formulation was hand knife coated at a wet thickness of .005 inch on clear cellulose acetate butyrate base. Drying was aided by the flow of hot water (110–120° F.) through the coating block. The resulting coatings were transparent. The coated material was called the matrix.

The original to be copied was covered with a thin sheet of cellulose triacetate (Kodapak). The matrix was placed, coated side, on the protected original. This sandwich was passed through a "Thermofax Secretary" in such a manner as to produce a reflex exposure. Following the exposure, the matrix was separated from the Kodapak sheet. Separation was obtained by a thin sheet of aluminum at the exit allowing the matrix to fall coated side face up onto a movable table of Masonite or other appropriate rigid material. The protected original was separated by passing over the aluminum sheet. An image-wise transfer was obtained by drawing the exposed matrix in contact with a suitable receiver such as a hydrophilic lithographic surface through steel rollers. This pressure application produced a right reading positive image. It should be emphasized that this is not a simultaneous exposure and pressure transfer but is rather an exposure followed by a momentary lag before an image-wise pressure transfer is made. The pressure was accomplished with the steel rollers at room temperature, or by merely scraping a straight edge over the matrix at room temperature. No further preparation of the Duplimat master's surface was needed except for the normal plate wetting with Multilith Platex Green. The image areas were hydrophobic, whereas, the nonimage areas were hydrophilic.

EXAMPLE 9

A coating formulation was prepared as follows:

| | | |
|---|---|---|
| Polyvinyl cinnamate | g | 1.26 |
| Carbowax 4000 | g | 4.6 |
| BNTZ ((2-benzoylmethylene)-1-methyl-β-naphthothiazoline) | g | 0.02 |
| Chlorobenzene | cc | 100 |

This formulation was whirl-coated on gel-subbed cellulose triacetate base or on silicated grained aluminum sheet at 78 r.p.m. After a light exposure of 10 seconds at 1 inch from GE sunlamp through a positive line transparency, the unexposed areas were heat-transferred to a paper receiving sheet by rolling the master in contact with the receiver using a hand roller. The transfer operation was carried out on a heat controlled hot plate with a surface temperature at approximately 150° F. When the sandwich was stripped apart, the unexposed areas had transferred to the receiver.

EXAMPLE 10

A coating formulation was prepared containing the following ingredients:

| | | |
|---|---|---|
| Chlorowax No. 70 (chlorinated paraffin wax having a melting point of 100° C.) | g | 5 |
| Poly(vinyl acetate-4-azidobenzoate) | g | 1 |
| BNTZ | g | 0.1 |
| Methyl ethyl ketone | ml | 50 |

The above formulation was then coated on Duplimat master paper and dried with the aid of forced warm air. The coating was exposed through a positive transparency in a pressure frame for 2 minutes, placed at 13 inches from an RFL No. 2 tungsten Photoflood lamp. The unexposed areas were then heat transferred as described in the above examples to a paper receiving sheet by rolling in contact with a hand roller.

While the above examples illustrate coating formulations wherein the light-sensitive resin is intimately mixed with the heat-fusible, waxy material, it is not always necessary to formulate the matrix sheets in this manner. Instead, the light-sensitive resin and the heat-fusible, waxy material can be separately coated onto a supporting surface. Where these components of the matrix sheet are coated as contiguous layers on a supporting surface, it has been found that it is not necessary to transfer the unexposed light-sensitive resin in order to obtain a visible image, since the waxy material diffuses into the light-sensitive resin in those areas which are not exposed to actinic radiation, thus giving sufficient contrast to create a visible image.

The following example illustrates the preparation of matrix sheets wherein the light-sensitive resin and the heat-fusible, waxy material are coated as contiguous layers.

EXAMPLE 11

A transparent support comprising regenerated cellulose, cellulose triacetate, poly(ethylene terephthalate), or diphenylolpropane polycarbonate was coated with a 1% solution of carnauba wax in trichloroethylene and then dried. The sheet was then sensitized by swabbing with cotton previously soaked in a 5% solution of a polyester of cinnamylidene-malonic acid and 1,4-butanediol in a 1:1 mixture of xylene and methyl isobutyl ketone. (This solution can also contain a sensitizer, if desired.) The solvent was then evaporated and the resulting matrix sheet was exposed for 5 seconds behind a line or halftone positive at 15 cm. from a Ma. 125 Mazda lamp. The resulting image was intensified by subjecting the matrix sheet to a draft of hot air at about 60° C. for a period of 10 seconds. An image of low contrast, but excellent definition, appeared. Examination under a microscope showed that the image was formed by a micro-unmixing of the carnauba wax and the light-sensitive resin.

Instead of obtaining the image on the matrix sheet as described in Example 11, it was found possible to transfer the unexposed areas to a stencil sheet or a Duplimat master sheet, either of which could be used to provide multiple copies. It has also been found that the matrix sheet, such as described in Example 11 above, can be immersed for a short time in water, such as for example, for 30 seconds at 25° C., then soaked with a dye by pressing it onto a hectographic carbon tissue. The resulting dyed matrix sheet can then be used in a spirit duplicating process of the ordinary type, that is, by wetting with alcohol or a water-alcohol mixture, and printing onto suitable surfaces.

If desired, a portion of the light-sensitive resin can be replaced by a substantial amount of light-insensitive resin without unduly lowering the efficiency of the compositions useful in our invention. For example, as much as 80% of the light-sensitive resin can be replaced by light-insensitive resins, such as Staybelite 742 resin, natural rosin with the levo-pimaric acid removed, etc.

Apparatus suitable for simultaneous infra-red and visible-light exposures of the matrix useful in our invention is well known. For example, such apparatus is described in Miller U.S. 2,740,895, issued April 3, 1956. The exposing source can be any of the available infra-red lamps or lamps having a high output of visible (and/or ultraviolet) radiation, such as a General Electric T-3 lamp having a linear coil filament supported within a reflector to focus the radiation in a narrow beam across the original as it is moved past the lamp. Such a lamp draws about 1350 watts at 280 volts and gives a color temperature of about 3000° K.

In FIGURE 1 of the drawing, the plastic sheet 12 is not essential and can be removed, although its removal causes some offsetting of the softened portions 15 to the original. It was possible to omit the plastic sheet 12 and to expose the matrix sheet with the support 10 in contact with areas 14 of the graphic original 13. The softened portions 15 can then be transferred to a suitable receiving sheet. Where the graphic original is transparent to visible light, it is not necessary to use a reflex exposure as illustrated in the drawing, but exposure can be made through the original onto the matrix sheet.

The invention has been described in detail with particular reference to preferred embodiments thereof, but it will be understood that variations and modifications can be effected within the spirit and scope of the invention as described hereinabove and as defined in the appended claims.

What we claim and desire secured by Letters Patent of the United States of America is:

1. A copying sheet which is transparent to infra-red radiation and comprises a support having coated thereon a polyvinyl light-sensitive resin containing an aromatic azido group and a waxy polyethylene glycol compound having a melting point between about 60° C. and 250° C. and being selected from those represented by the following general formula:

$$R{-}OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and $n$ represents a positive integer of at least 7.

2. A method of preparing a copy of a graphic original comprising exposing a heat-sensitive, light-sensitive, infra-red transparent, matrix sheet to said graphic original with actinic radiation, said matrix sheet comprising (1) a light-sensitive polyvinyl resin containing an aromatic azido group, and (2) a waxy polyethylene glycol compound having a melting point between about 60° C. and 250° C. and being selected from those represented by the following general formula:

$$R{-}OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and $n$ represents a positive integer of at least 7, thereby causing hardening of said light-sensitive resin in the exposed areas, heating said matrix sheet to a temperature sufficient to cause softening of said light-sensitive resin in the unexposed areas but substantially no softening in the actinic light-exposed areas, and transferring said softened resin to a receiving sheet.

3. A method of preparing a copy of a graphic original comprising exposing a heat-sensitive, light-sensitive, infra-red transparent, matrix sheet to said graphic original with actinic radiation, said matrix sheet comprising (1) a light-sensitive resin comprising polyvinyl azidobenzoate and (2) a waxy polyethylene glycol compound having a melting point between about 60° C. and 250° C. and being selected from those represented by the following general formula:

$$R{-}OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and $n$ represents a positive integer of at least 7, thereby causing hardening of said light-sensitive resin in the exposed areas, heating said matrix sheet to a temperature sufficient to cause softening of said light-sensitive resin in the unexposed areas but substantially no softening in the visible light-exposed areas, and transferring said softened resin to a receiving sheet.

4. A method of preparing a copy of a graphic original comprising exposing a heat-sensitive, light-sensitive, infra-red transparent, matrix sheet to said graphic original with actinic radiation, said matrix sheet comprising (1) a light-sensitive resin comprising polyvinyl acetate azidophthalate and (2) a waxy polyethylene glycol compound having a melting point between about 60° C. and 250° C. and being selected from those represented by the following general formula:

$$R{-}OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and $n$ represents a positive integer of at least 7, thereby causing hardening of said light-sensitive resin in the exposed areas, heating said matrix sheet to a temperature sufficient to cause softening of said light-sensitive resin in the unexposed areas but substantially no softening in the actinic light-exposed areas, and transferring said softened resin to a receiving sheet.

5. A method of preparing a copy of a graphic original comprising exposing a heat-sensitive, light-sensitive, infra-red transparent, matrix sheet to said graphic original with actinic radiaton, said matrix sheet comprising (1) a light-sensitive resin comprising polyvinyl cinnamate, and (2) a waxy polyethylene glycol compound having a melting point between about 60° C. and 250° C. and being selected from those represented by the following general formula:

$$R{-}OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and $n$ represents a positive integer of at least 7, thereby causing hardening of said light-sensitive resin in the exposed areas, heating said matrix sheet to a temperature sufficient to cause softening of said light-sensitive resin in the unexposed areas but substantially no softening in the actinic light-exposed areas, and transferring said softened resin to a receiving sheet.

6. A method of preparing a copy of a graphic original containing portions highly absorptive of infra-red energy and other portions substantially non-absorptive of said infra-red energy, comprising placing said infra-red absorptive portions of said graphic original in surface contact with an infra-red, actinic light transparent plastic sheet, placing a heat-sensitive, light-sensitive matrix sheet in contact with the outer surface of said transparent plastic sheet, said matrix sheet being transparent to infra-red radiation and actinic radiation and comprising a support and a heat-sensitive, light-sensitive surface, comprising (1) a light-sensitive polyvinyl resin containing an aromatic azido group and (2) a waxy polyethylene glycol compound having a melting point between about 60° C. and 250° C. and being selected from those represented by the following general formula:

$$R—OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical, *n* represents a positive integer of at least 7, briefly exposing said graphic original to intense infra-red and actinic radiation through said matrix sheet, thereby causing a heat pattern to be produced in said graphic original in those areas corresponding to the infra-red absorbing portion of said graphic original and a softening of the surface of said matrix sheet in those areas corresponding to the infra-red absorbing portions of said graphic original, and hardening the actinic radiation exposed areas of said matrix sheet, and transferring said softened portions of said matrix sheet to a receiving sheet.

7. A method according to claim 6 wherein the light-sensitive resin is poly(vinyl acetate-3-azido phthalate).

8. A process according to claim 6 wherein the light-sensitive resin is poly(vinyl acetate-4-azido benzoate).

9. A method of preparing a copy of a graphic original containing portions highly absorptive of infra-red energy and other portions substantially non-absorptive of said infra-red energy, comprising placing said infra-red absorptive portions of said graphic original in surface contact with an infra-red, actinic light transparent plastic sheet, placing a heat-sensitive, light-sensitive matrix sheet in contact with the outer surface of said transparent plastic sheet, said matrix sheet being transparent to infra-red radiation and actinic radiation and comprising a support and a heat-sensitive, light-sensitive surface, said heat-sensitive, light-sensitive surface comprising (1) polyvinyl cinnamate and (2) a waxy polyethylene glycol compound having a melting point between about 60° C. and 250° C and being selected from those represented by the following general formula:

$$R—OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical, *n* represents a positive integer of at least 7, briefly exposing said graphic original to intense infra-red and actinic radiation through said matrix sheet, thereby causing a heat pattern to be produced in said graphic original in those areas corresponding to the infra-red absorbing portion of said graphic original and a softening of the surface of said matrix sheet in those areas corresponding to the infra-red absorbing portions of said graphic original, and hardening the actinic radiation exposed areas of said matrix sheet, and transferring said softened portions of said matrix sheet to a receiving sheet.

10. A copying sheet which is transparent to infra-red radiation and comprises a transparent support having coated thereon a mixture comprising a polyvinyl light-sensitive resin containing at least one of the following: (*a*) aromatic azide groups and (*b*) α,β-unsaturated carboxylic acid ester groups, said α,β-unsaturated carboxylic ester groups being directly attached to the polyvinyl chain of said polyvinyl light-sensitive resin through the $$-\overset{\overset{\displaystyle O}{\|}}{C}-O-$$

radical of said α,β-unsaturated carboxylic acid, and a waxy polyethylene glycol compound having a melting point between about 60° C. and 250° C. and being selected from those represented by the following general formula:

$$R—OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and *n* represents a positive integer of at least 7.

11. A copying sheet which is transparent to infra-red radiation and comprises a polyvinyl light-sensitive ester of cinnamic acid, the $$-\overset{\overset{\displaystyle O}{\|}}{C}-O-$$

radical of said cinnamic acid being directly attached to the polyvinyl chain of said polyvinyl light-sensitive ester, and a waxy polyethylene glycol compound having a melting point between about 60° C. and 250° C. and being selected from those represented by the following general formula:

$$R—OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and *n* represents a positive integer of at least 7.

12. A method of preparing a copy of a graphic original comprising exposing a heat-sensitive, light-sensitive, infra-red transparent, matrix sheet to said graphic original by means of actinic radiation, said matrix sheet comprising a light-sensitive polyvinyl resin containing at least one of the following: (*a*) aromatic azide groups and (*b*) α,β-unsaturated carboxylic acid ester groups, said α,β-unsaturated carboxylic ester groups being directly attached to the polyvinyl chain of said polyvinyl light-sensitive resin through the $$-\overset{\overset{\displaystyle O}{\|}}{C}-O-$$

radical of said α,β-unsaturated carboxylic acid, and a waxy polyethylene glycol compound having a melting point between about 60° C. and 250° C. and being selected from those represented by the following general formula:

$$R—OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and *n* represents a positive integer of at least 7, thereby causing hardening of said light-sensitive resin in the exposed areas, heating said matrix sheet to a temperature sufficient to cause softening of said light-sensitive resin in the unexposed areas, but substantially no softening in the actinic light-exposed areas, and transferring said softened resin to a receiving sheet.

13. A method of preparing a lithographic duplicating master of a graphic original comprising exposing a heat-sensitive, infra-red transparent matrix sheet to said graphic original by means of actininc radiation, said matrix sheet comprising a hydrophobic, light-sensitive, polyvinyl resin containing at least one of the following: (*a*) aromatic azide groups and (*b*) α,β-unsaturated carboxylic acid ester groups, said α,β-unsaturated carboxylic ester groups being directly attached to the polyvinyl chain of said polyvinyl light-sensitive resin through the $$-\overset{\overset{\displaystyle O}{\|}}{C}-O-$$

radical of said $\alpha,\beta$-unsaturated carboxylic acid, and a waxy polyethylene glycol compound having a melting point between about 60° C. and 250° C. and being selected from those represented by the following general formula:

$$R-OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and *n* represents a positive integer of at least 7, thereby causing hardening of said hydrophobic light-sensitive resin in the exposed areas, heating said matrix sheet to a temperature sufficient to cause softening of said hydrophobic light-sensitive resin in the unexposed areas, but substantially no softening in the actinic light-exposed areas and transferring said softened hydrophobic resin to a hydrophilic receiving sheet.

14. A method of preparing a copy of a graphic original comprising exposing a heat-sensitive, light-sensitive, infra-red transparent matrix sheet to said graphic original by means of actinic radiation, said matrix sheet comprising an infra-red transparent coloring material, a light-sensitive polyvinyl resin containing at least one of the following: (*a*) aromatic azide groups and (*b*) $\alpha,\beta$-unsaturated carboxylic acid ester groups, said $\alpha,\beta$-unsaturated carboxylic ester groups being directly attached to the polyvinyl chain of said polyvinyl light-sensitive resin through the $$-\overset{\overset{\displaystyle O}{\|}}{C}-O-$$

radical of said $\alpha,\beta$-unsaturated carboxylic acid, and a waxy polyethylene glycol compound having a melting point between about 60° C. and 250° C. and being selected from those represented by the following general formula:

$$R-OCH_2CR_2O(CH_2CH_2O)_nCH_2CH_2OR_1$$

wherein R and $R_1$ each represents a member selected from the class consisting of a hydrogen atom, an alkyl radical and a carboxylic acyl radical and *n* represents a positive integer of at least 7, thereby causing hardening of said light-sensitive resin in the exposed areas, heating said matrix sheet to a temperature sufficient to cause softening of said light-sensitive resin in the unexposed areas, but substantially no softening in the actinic light-exposed areas, and transferring said softened resin to a receiving sheet.

15. A method of preparing a copy of a graphic original comprising exposing a heat-sensitive, light-sensitive, infra-red transparent matrix sheet to said graphic original with actinic radiation, said matrix sheet comprising (1) a light-sensitive polyvinyl ester of an $\alpha,\beta$-unsaturated carboxylic acid, wherein the $$-\overset{\overset{\displaystyle O}{\|}}{C}-O-$$

radical of said $\alpha,\beta$-unsaturated carboxylic acid is directly attached to the polyvinyl chain of said polyvinyl ester, and (2) a waxy polyethylene glycol compound having a melting point between about 60° C. and 250° C. and being selected from those represented by the following general formula:

$$R-OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and *n* represents a positive integer of at least 7, thereby causing hardening of said light-sensitive resin in the exposed areas, heating said matrix sheet to a temperature sufficient to cause softening of said light-sensitive resin in the unexposed areas but substantially no softening in the actinic light-exposed areas, and transferring said softened resin to a receiving sheet.

16. A method of preparing a copy of a graphic original containing portions highly absorptive of infra-red energy and other portions substantially non-absorptive of said infra-red energy, comprising placing said infra-red absorptive portions of said graphic original in surface contact with an infra-red, actinic light-transparent plastic sheet, placing a heat-sensitive, light-sensitive matrix sheet in contact with the outer surface of said transparent plastic sheet, said matrix sheet being transparent to infra-red radiation and actinic radiation and comprising a support and a heat-sensitive, light-sensitive surface, said heat-sensitive, light-sensitive comprising a light-sensitive polyvinyl resin containing at least one of the following: (*a*) aromatic azide groups and (*b*) $\alpha,\beta$-unsaturated carboxylic acid ester groups, said $\alpha,\beta$-unsaturated carboxylic ester groups being directly attached to the polyvinyl chain of said polyvinyl light-sensitive resin through the $$-\overset{\overset{\displaystyle O}{\|}}{C}-O-$$

radical of said $\alpha,\beta$-unsaturated carboxylic acid, and a waxy polyethylene glycol compound having a melting point between about 60° C. and 250° C. and being selected from those represented by the following general formula:

$$R-OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical and *n* represents a positive integer of at least 7, briefly exposing said graphic original to intense infra-red and actinic radiation through said matrix sheet, thereby causing hardening of said light-sensitive resin in the exposed areas, heating said matrix sheet to a temperature sufficient to cause softening of said light-sensitive resin in the unexposed areas, but substantially no softening in the actinic light-exposed areas, and transferring said softened resin to a receiving sheet.

17. A method of preparing a copy of a graphic original containing portions highly absorptive of infra-red energy and other portions substantially non-absorptive of said infra-red energy, comprising placing said infra-red absorptive portions of said graphic original in surface contact with an infra-red, actinic light-transparent plastic sheet, placing a heat-sensitive, light-sensitive matrix sheet in contact with the outer surface of said transparent plastic sheet, said matrix sheet being transparent to infra-red radiation and actinic radiation and comprising a support and a heat-sensitive, light-sensitive surface, said heat-sensitive, light-sensitive surface comprising (1) a light-sensitive, polyvinyl resin containing at least one of the following: (*a*) aromatic azide groups and (*b*) $\alpha,\beta$-unsaturated carboxylic acid ester groups, said $\alpha,\beta$-unsaturated carboxylic ester groups being directly attached to the polyvinyl chain of said polyvinyl light-sensitive resin through the $$-\overset{\overset{\displaystyle O}{\|}}{C}-O-$$

radical of said $\alpha,\beta$-unsaturated carboxylic acid, (2) an infra-red transparent coloring material and (3) a waxy polyethylene glycol compound having a melting point between about 60° C. and 250° C. and being selected from those represented by the following general formula:

$$R-OCH_2CH_2O(CH_2CH_2O)_nCH_2CH_2OR_1$$

wherein R and $R_1$ each represents a member selected from the class consisting of a hydrogen atom, an alkyl radical and a carboxylic acyl radical, *n* represents a positive integer of at least 7, briefly exposing said graphic original to intense infra-red and actinic radiation through said matrix sheet, thereby causing a heat pattern to be produced in said graphic original in those areas corresponding to the infra-red absorbing portion of said graphic original and a softening of the surface of said matrix sheet in those areas corresponding to the infra-red absorbing portions of said graphic original, and hardening the actinic radiation exposed areas of said matrix sheet, and transferring said softened portions of said matrix sheet to a receiving sheet.

18. A copying sheet which is transparent to infra-red radiation and comprises a support and coated on said support in contiguous relationship a light-sensitive polyvinyl resin containing at least one of the following: (*a*) aromatic azide groups and (*b*) $\alpha,\beta$-unsaturated carboxylic acid ester groups, said $\alpha,\beta$-unsaturated carboxylic ester groups being directly attached to the polyvinyl chain of said polyvinyl light-sensitive resin through the $$-\overset{\overset{\displaystyle O}{\|}}{C}-O-$$

radical of said $\alpha,\beta$-unsaturated carboxylic acid, and a heat-fusible wax having a melting point between about 60° C. and 250° C.

19. A copying sheet which is transparent to infra-red radiation and comprises a support having coated thereon a mixture comprising a light-sensitive polyvinyl resin containing at least one of the following: (*a*) aromatic azide groups and (*b*) $\alpha,\beta$-unsaturated carboxylic acid ester groups, said $\alpha,\beta$-unsaturated carboxylic ester groups being directly attached to the polyvinyl chain of said polyvinyl light-sensitive resin through the $$-\overset{\overset{\displaystyle O}{\|}}{C}-O-$$

radical of said $\alpha,\beta$-unsaturated carboxylic acid, and a heat-fusible wax having a melting point between about 60° C. and 250° C.

20. A method of preparing a copy of a graphic original comprising exposing a heat-sensitive, light-sensitive matrix sheet to said graphic original by means of actinic radiation, said matrix sheet comprising a light-sensitive polyvinyl resin containing at least one of the following: (*a*) aromatic azide groups and (*b*) $\alpha,\beta$-unsaturated carboxylic acid ester groups, said $\alpha,\beta$-unsaturated carboxylic ester group being directly attached to the polyvinyl chain of said polyvinyl light-sensitive resin through the $$-\overset{\overset{\displaystyle O}{\|}}{C}-O-$$

radical of said $\alpha,\beta$-unsaturated carboxylic acid, and a hydrophobic wax melting between about 60° C. and 250° C., said matrix sheet being transparent to infra-red radiation, thereby causing hardening of said light-sensitive polyvinyl resin in the areas exposed to said actinic radiation, heating said matrix sheet to a temperature sufficient to cause softening of said light-sensitive polyvinyl resin in the areas not exposed to actinic radiation, but substantially no softening in the areas not exposed to actinic radiation and transferring said softened resin to a receiving sheet.

References Cited in the file of this patent

UNITED STATES PATENTS

| | | |
|---|---|---|
| 1,965,710 | Murray | July 10, 1934 |
| 2,091,715 | Murray | Aug. 31, 1937 |
| 2,155,590 | Garvey | Apr. 25, 1939 |
| 2,228,365 | Reppe et al. | Jan. 14, 1941 |
| 2,318,959 | Muskat et al. | May 11, 1943 |
| 2,353,228 | Ducca | July 11, 1944 |
| 2,704,712 | Jackson | Mar. 22, 1955 |
| 2,740,895 | Miller | Apr. 3, 1956 |
| 2,748,024 | Klimkowski et al. | May 29, 1956 |
| 2,756,143 | Murray | July 24, 1956 |
| 2,856,283 | Yackel et al. | Oct. 14, 1958 |
| 2,864,783 | Cornwell | Dec. 16, 1958 |
| 2,937,098 | Geen | May 17, 1960 |
| 2,948,610 | Merrill et al. | Aug. 9, 1960 |

FOREIGN PATENTS

| | | |
|---|---|---|
| 761,493 | Great Britain | Nov. 14, 1956 |
| 761,495 | Great Britain | Nov. 14, 1956 |